UNITED STATES PATENT OFFICE.

CHARLES M. HIGGINS, OF BROOKLYN, NEW YORK.

ADHESIVE PASTE.

SPECIFICATION forming part of Letters Patent No. 546,401, dated September 17, 1895.

Application filed February 20, 1894. Serial No. 500,877. (No specimens.)

*To all whom it may concern:*

Be it known that I, CHARLES M. HIGGINS, of Brooklyn, Kings county, New York, have invented certain new and useful Improvements in Adhesive Paste, of which the following is a specification.

The main object of my invention is to provide an adhesive paste for mounting photographs and other objects which will obviate the serious defects which exist with the usual starch, flour, or tragacanth pastes. It is well known that in pastes made of either pure starch and water or of water and any of the cereal flours—such as wheat, rye, rice, &c.—the starchy or glutinous matters do not exist in a state of perfect solution or combination with the water, but only in a gelatinous or swelled state, and after a limited time the water tends to separate from the adhesive matter, which is left in an inert gelatinous form, which soon loses its homogeneity and rapidly deteriorates. Now, as the water which thus separates always contains a weak solution of extractive matter, and as such weak solutions are always very subject to quick fermentation or putrefaction, this will readily explain one cause of the rapid change in such pastes, which, as is well known, soon renders them unfit for use. Now, it is obvious that this offensive and destructive change would not be nearly so likely to occur if the ingredients were to remain combined in a dense solution, for such changes do not take place readily in dense solutions, but only in weak solutions, as is well known to chemists and biologists. Another great objection to the ordinary starchy and glutinous pastes is the large amount of water required to hold or swell the gluten or starch to the desired consistency for proper application, so that these pastes always contain a very great percentage of water and a very small percentage of solid adhesive matter swelled up into a great bulk by the preponderating water. Hence such pastes do not "catch" or adhere very quickly and take a long time in drying, and their moisture being so great and not in tenacious combination with the adhesive matter strikes through the paper or fabric being mounted, and hence tends to stain, warp, and buckle the same in a very objectionable manner, which has always been a serious objection to such pastes. In the case of pastes made of gum-tragacanth and water the conditions are almost exactly the same as with starch or flour, except that the union with the water is probably a little better and separation does not take place quite so readily.

Now, the object of my invention is to provide an adhesive in a distinctly pasty or non-fluid form, but of a soft and unctuous consistency, which will contain more solid adhesive matter and less water than the usual pastes and in which the adhesive matter will be in perfect combination or solution with the water and not liable to gelatinous separation, which will keep good indefinitely, be smooth and easy of application, adhere quickly, and not strike through, stain, or warp the mount. To these ends I have discovered that a paste having the desired qualities can be produced from white dextrine and water, when manipulated and treated in the manner hereinafter described, which may be briefly stated to consist in making a solution of white dextrine in hot water rapidly and at a limited temperature, then cooling the solution quickly and treating it to a long period of rest until matured into a non-fluid softly-coherent paste, as hereinafter fully set forth and claimed. Dextrines, of course, have been commonly used in pastes, either wholly or in combination with other adhesive substances; but for such purposes the yellow dextrines have been generally used, and no paste such as I describe has been produced from white dextrine previous to my invention. Where, however, dextrine has been used, the pastes have been made too fluid, like mucilage, or too thick, like a gummy mass, and not possessing that peculiar soft coherent and unctuous consistency so much desired in a mounting-paste, and which my present invention secures. Indeed, the chief problem of my invention is to get a dextrine solution in a non-fluid but soft pasty form with a less amount of dextrine than usual, so as to secure a smoother lighter body, which will not spill, yet will be taken up readily by the brush and spread more smoothly and easily, and yet will not strike through the paper, and will adhere quickly. Hence the gist of my invention might be said to lie in imparting a certain physical condition or consistency to the dextrine solution, as hereinafter shown. The yellow dextrines are not amenable to the treatment or capable of producing the result which is the gist of my invention, and which can only be obtained with white dextrine, which is a distinct variety.

In making my improved paste I therefore take white dextrine and dissolve the same in warm water, it being important that the solution be made in warm water and at a limited or moderate temperature, and also rapidly or in such manner as to avoid any long-continued heat for I find that if it is made at a high temperature or under long-continued heat the solution cannot be made to assume a proper pasty form or have the soft unctuous non-fluid consistency which distinguishes my new product. Furthermore, if the solution is made in cold water it will remain permanently fluid and cannot be made to assume this non-fluid or pasty form unless the solution is made so thick or dense as to be stiff and unyielding to the brush, incapable of easy spreading, too quickly drying, and useless for such reasons.

For an ordinary paste I take, say, from four to six pounds of white dextrine to the gallon of water, preferably about five pounds, six pounds being about the practicable limit for proper consistency. The water should be heated only to about a scalding temperature, or preferably not over 160° or 170° Fahrenheit, usually from 150° to 160°, although a temperature down to nearly 100° can be used. As, however, a high temperature or long-continued heat would prevent the solution from afterward acquiring the desired pasty consistency, I find that a temperature of about 150° to 160° Fahrenheit is usually preferable, as the solution is effected so much quicker at this heat that it avoids a longer continued heat, which would be necessary to effect the solution at a lower temperature, and which might even be more unfavorable to the desired result than a higher heat for a shorter time. After the water has thus been raised to 150° or 160° the heat is shut off, and the dextrine is at once added and dissolved as rapidly as possible by stirring, blending, or agitation, until a smooth clear solution is produced, which will generally be effected in about ten or fifteen minutes. Any desired antiseptics or flavoring substances can be incorporated at the same time, so as to avoid any further stirring or agitation after the solution is run off. The solution will now be a thin transparent fluid, whereas a starch or flour paste would become very thick at this moment of full solution, although it would contain much less solid matter and much more water than this thin dextrine solution. The liquid dextrine solution will usually have a temperature at this point of about 125° to 135°, and it should now be allowed to cool down as rapidly as possible to the temperature of the air, and should be at once filled out into the jars, bottles, or other packages in which it is to be sold, so as to divide up the hot mass as soon as possible and promote and quicken its cooling. The packages should be then closed or sealed and laid away in a cool quiet place where they can remain quiescent or at rest free from disturbance or agitation for a prolonged period, usually from one week to one or two months, so as to age or mature the solution, which during this time will entirely change its appearance and consistency. When thus properly matured, the solution in the jars will have acquired the following qualities and appearance—that is, it will now be non-fluid and will not spin or flow if the jar is inclined or inverted and will have a pure opaque or porcelain-white color, sometimes opalescent, instead of the transparent and thinly-fluid form at the outset. Its consistency will now be such that while it is non-fluid and pasty it will possess a very softly-coherent or unctuous consistency, which enables it to yield readily to the brush when dipped into the same, and when blended or spread with the brush it becomes smoothly fluid without any gelatinous granulation like the usual pastes, which quality enables it to be spread in a most smooth and even film over the mount. As the adhesive matter is in perfect solvent combination with the water of the solution, the water does not separate and soak into the paper, as is the case with flour and starch pastes, and as the solution tends to return to the pasty or non-fluid form as soon as at rest from the movements of the brush the film spread on the mount does not strike through the paper, but remains where it has been placed by the brush, and will adhere at once and with great tenacity when pressed to the surface on which the mount is to be fixed, thus effecting most perfect mounting without any appreciable warping or cockling of the picture. After this peculiar pasty consistency of the adhesive has been once acquired by the treatment described, it is permanent, unless the paste is very much stirred or agitated, when it becomes fluid, or, rather, fluent, but will return again to the soft non-fluent form when again left at rest, which is a most important quality. By the treatment described this desirable consistency can be obtained with a density of between four and five pounds of dextrine to the gallon of water, or even less, whereas without this treatment only a fluid form would be produced with that density, and to get the non-fluid form a density of six pounds or more would be required, and then the paste would be so stiff or inert as not to yield to the brush when dipped into the same and would not be capable of being easily spread with the brush, or when so spread would exist in a too thick and too quickly drying film, which would render good mounting difficult.

In order to expedite the maturing of the dextrine solution into the non-fluid but soft unctuous pasty form described and to avoid the long period of rest specified, I have discovered that the described condition can be produced in a much shorter time by subjecting the liquid solution to a cold temperature, which greatly expedites the manufacture and also improves the product. To do this the hot solution before being run out into the jars should be chilled or cooled down rapidly by the application of cold, furnished by crushed ice, a freezing-mixture, or other source of cold, so as to reduce it to a temperature of about 40° or 50°, but a higher or lower temperature will do, and the chilled solution is then filled at once into the jars with as little stirring or agitation as possible, and these jars are sealed and then put into a refrigerating chamber to continue the chilling. The temperature in this chamber should be kept at about 40° or 45° Fahrenheit, preferably, although it may be lower or higher, but it should not be higher than 55°, which is about the effective limit. The mixture will freeze at about 28° Fahrenheit, and although it will not be appreciably injured by freezing, yet it is better to avoid this freezing-point as a limit in the lower direction and use a temperature of about 35° to 45° as the most efficient range. Where the jars or bottles are of small size, the hot solution can be filled directly into the same without previous chilling and can be then put into the refrigerating-chamber for chilling and maturing; but where the packages are large, say eight ounces or over, the hot solution should first be chilled or cooled before filling into the jars and then put into the refrigerator, as it is important to abstract the heat as rapidly as possible from all large masses, which left to themselves would cool slowly by mere radiation. By this chilling or refrigerating operation, in addition to the period of rest, the adhesive may thus be matured into the non-fluid soft pasty form in a few days, or in one week, more or less, and will then be ready for the market, thus making a great saving of time and space in the manufacture. The quality will also be improved, as a firmer consistency will be imparted without detracting from the smoothness, homogeneity, and softness when spread with the brush. Another advantage is that this consistency can be obtained with a much less density—that is, with four pounds or less to the gallon, whereas from four and one-half to five pounds would be required without the chilling operation to get a similar body, while the adhesiveness of the lighter solution is not appreciably inferior to the heavier solution, but is much preferable in not drying so quickly as the heavier solution and thus giving more time for the proper manipulation of the mount, which is an important consideration in practicable work. Furthermore, the solution, though lighter, has no more tendency to strike into the mount than the heavier solution on account of the superior body imparted by the chilling, which is of great importance. It should be here understood that the superior consistency imparted by the chilling is permanent and is not altered by afterward keeping the paste in a much higher temperature or within any habitable range, say, up to 100°; but further heat up to near the point of solution would, of course, again liquefy the adhesive.

For the purpose of this invention any good quality of white dextrine may be used, but preference should be given to potato dextrine rather than to that from other forms of starch.

What I claim as my invention is—

1. An adhesive paste formed of white dextrine and water substantially in the manner and proportions described and having the qualities set forth; to wit:—a pure white color, homogeneous texture, soft unctuous consistency, non-fluid at rest, and becoming fluent on agitation, substantially as herein set forth.

2. The herein described process of making an adhesive paste, viz., first making a thin liquid solution of white dextrine in warm water, then filling said solution into jars or packages, and then cooling and keeping said packages at rest for a prolonged period until the contents assume a white pasty form, substantially as herein set forth.

3. The mode herein described of making an adhesive paste, viz., first dissolving white dextrine in warm water, then chilling said solution and keeping it refrigerated at or below a temperature of 55° Fahrenheit for a prolonged period until set or matured into a white pasty form, substantially as herein set forth.

CHAS. M. HIGGINS.

Witnesses:
JNO. E. GAVIN,
HENRIETTA N. NICOLAI.

It is hereby certified that in Letters Patent No. 546,401, granted September 17, 1895, upon the application of Charles M. Higgins, of Brooklyn, New York, for an improvement in "Adhesive Paste," an error appears in the printed specification requiring correction as follows: In line 80, page 2, the word "spin" should read *spill;* and that the said Letters Patent should be read with this correction therein that the same may conform to the record of the case in the Patent Office.

Signed, countersigned, and sealed this 24th day of September, A. D. 1895.

[SEAL.]

JNO. M. REYNOLDS,
*Assistant Secretary of the Interior.*

Countersigned:
    S. T. FISHER,
        *Acting Commissioner of Patents.*